W. H. SHUFF.
ARTIFICIAL BAIT KNOWN AS PLUGS OR WOOD MINNOWS.
APPLICATION FILED JULY 19, 1917.
1,268,635.
Patented June 4, 1918.
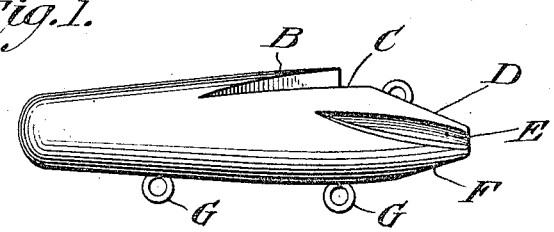
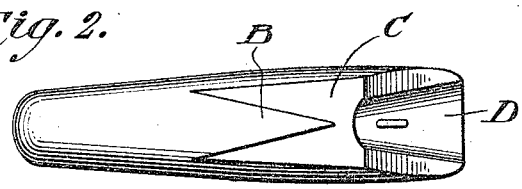
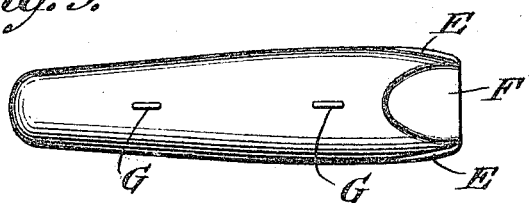

UNITED STATES PATENT OFFICE.

WILLIAM H. SHUFF, OF KANSAS CITY, MISSOURI.

ARTIFICIAL BAIT KNOWN AS PLUGS OR WOOD MINNOWS.

1,268,635.      Specification of Letters Patent.      Patented June 4, 1918.

Application filed July 19, 1917. Serial No. 181,569.

*To all whom it may concern:*

Be it known that I, WILLIAM H. SHUFF, a citizen of the United States, residing at Kansas City, in the county of Jackson and State of Missouri, have invented a certain new and useful Improvement in Artificial Baits known as Plugs or Wood Minnows, of which the following is a specification.

The invention relates to floating baits for trolling or casting, and the object of the invention is to provide a bait of this class which when resting idle in the water can be automatically submerged a short distance beneath the surface of the water by the action of the latter thereon, due to the movement of the boat in trolling or the recovery of the line in casting.

The invention consists in certain novel combinations and features and details of construction and arrangements by which the above object is attained as hereinafter set forth.

The accompanying drawings form a part of these specifications and show a general form of this invention as it has been carried out in practice, and found very effective.

Figure 1, is a side view, showing a general form of the invention as it appears from one side.

Fig. 2, is an upper or top view as it appears looking down from above it, and

Fig. 3, is a view of the bottom and under side of the invention.

The hooks are not shown in the drawings, as they may be of varied numbers, size and shape as necessity may demand. Similar letters of reference indicate like parts in each figure.

The invention is based on a type of bait termed a "plug" or wood minnow consisting of a short cylindrical length of wood equipped with hooks and adapted to be drawn through the water.

Many variations of this type are used and in all the forms the bait is drawn along on or near the surface of the water.

In the present improvement the cylindrical plug is so shaped or beveled at the head or front end, letter D Figs. 1 and 2 that it presents a partly flat and slightly concave inclined surface to the action of the water, and when in operation causes the plug to dive or descend in a more or less upright position and would be useless as a bait were this action not offset to an extent by the bevel being connected at the top with the flat surface or plane C, Figs. 1 and 2, and at the bottom and front end with the concave upward bevel, Fig. 3, F, also the ascending grooves on either side, Fig. 1 E, have a tendency to equalize the motion, the result of the combination being a plug that rides in the water with the rear or tail end slightly elevated above the horizontal, just sufficient to allow the hooks to swing with no frequent or great contact with the body of the plug.

The wedge of V shaped shoulder B, Figs. 1 and 2, on the top or upper side of plug splits the flat surface or plane, C, Figs. 1 and 2 and divides the water causing the plug to vibrate from side to side, according to the force of the water. This action is also assisted by the grooves E Fig. 1 to some extent causing more of a quivering motion. Were either the grooves, or wedged shaped shoulder eliminated, the action would not be so good; and if the concave upward bevel F, Fig. 3, on the front end bottom side were eliminated, it would act fairly well but would be inclined to dive deeper in the water. Thus it seems the combination herein shown gives a very superior action, proved by experience lately.

The screw eyes G, Fig. 1, on the lower side of plug, to which hooks are attached are sufficient ballast to cause the plug to float right side up. These screw eyes for the hooks are located preferably on the bottom though there might be more and otherwise located.

At a central point sidewise in the concave bevel, D Fig. 2, a screw-eye is inserted near the upper end of the bevel to which the line is attached for the purpose of operating the plug.

With the line attached to the screw-eye in the bevel D, (which presents to the water a partly flat and partly concave surface) the operator drawing the plug through the water the bevel induces the plug to dive, head down, tail up which action is met and counteracted by the action of the water on the flat surface or plane C, Figs. 1 and 2, and the concave upward bevel F (Fig. 3) at the front end bottom side, and to some extent by the grooves E, Fig. 1. The wedge shaped shoulder B Figs. 1 and 2 causes the vibration from side to side, assisted to some extent by the grooves E, thus the plug rides through the water with the tail end slightly elevated above the head end with a quivering, vibrating motion, the screw eye to which the line is attached acting as a pivot at a short distance below and parallel with the surface of the water. This is an action very much desired by fishermen, and this plug when painted enticing colors has proved very attractive to game fish recently.

Having thus described my invention what I claim as new and desire to secure by Letters Patent is:

1. An artificial bait comprising a buoyant body having a portion of the top thereof flattened, and wedge shaped water deflecting means formed integral with the upper portion of said body arranged adjacent the flattened upper surface for imparting vibration thereto during movement of the bait through water.

2. An artificial bait, comprising a buoyant body having its forward portion beveled, and wedge shaped water deflecting means formed integral with the upper portion of said body and extending to a point adjacent the upper end of the beveled forward portion for imparting vibration to the body upon movement of the same through water.

3. An artificial bait, comprising a buoyant body having its forward portion beveled, said beveled portion having a tapering recess formed therein, and water deflecting means formed integral with the upper portion of said body.

4. An artificial bait comprising a buoyant body having the forward portion thereof beveled, said beveled portion having a tapering recess formed therein, and a wedge shaped water deflecting element formed integral with the upper portion of the body extending to a point adjacent the beveled forward portion.

5. An artificial bait comprising a buoyant body having its forward portion beveled and dished, the forward upper portion of said body being flattened, and a wedge shaped water deflecting element formed integral with the upper portion of the body and extending onto the flattened upper portion of the same.

6. An artificial bait comprising a tapering body circular in cross section having its forward end beveled and dished, and water deflecting means formed integral with the upper portion of said body and extending to a point adjacent the beveled end.

7. An artificial bait comprising a buoyant body having its forward end beveled and dished, the forward upper portion of said body being flattened, a wedge shaped element formed integral with the upper portion of the body and extending onto the flattened forward portion, the underside of the forward portion of said body being recessed.

8. An artificial bait comprising a buoyant tapered body circular in cross section having its forward end beveled and dished, the upper forward portion of the body being flattened, a substantially V-shaped element formed integral with the upper portion of the body and extending onto the flattened portion to a point adjacent the beveled end, the under side of the forward end of said body being recessed.

In testimony that I claim the invention above set forth I affix my signature in the presence of two witnesses.

WILLIAM H. SHUFF.

Witnesses:
J. G. BRAMWELL,
H. S. HARTLEY.